United States Patent
Fukui

[11] Patent Number: 5,809,350
[45] Date of Patent: Sep. 15, 1998

[54] FLASH DEVICE HAVING FLAT EMISSION MODE

[75] Inventor: Hajime Fukui, Tokyo, Japan

[73] Assignee: Canon Kabushiki Kaisha, Tokyo, Japan

[21] Appl. No.: 693,858

[22] Filed: Aug. 5, 1996

[30] Foreign Application Priority Data

Aug. 21, 1995 [JP] Japan ................................. 7-212020

[51] Int. Cl.[6] ...................................................... G03B 7/00
[52] U.S. Cl. ........................................... 396/166; 396/180
[58] Field of Search ...................................... 396/166, 168, 396/169, 171, 180, 195

[56] References Cited

U.S. PATENT DOCUMENTS

| | | | |
|---|---|---|---|
| 4,816,853 | 3/1989 | Kikukawa et al. | 354/412 |
| 5,283,610 | 2/1994 | Sasaki | 396/171 X |

FOREIGN PATENT DOCUMENTS

| | | |
|---|---|---|
| 3503726 | 8/1985 | Germany . |
| 59-224831 | 12/1984 | Japan . |
| 62-071939 | 4/1987 | Japan . |
| 63-148737 | 6/1988 | Japan . |

OTHER PUBLICATIONS

Patent Abstracts of Japan No. JP63148737, published Jun. 21, 1988, vol. 12, No. 412.
Patent Abstracts of Japan No. JP62071939, published Apr. 2, 1987, vol. 11, No. 270.
Patent Abstracts of Japan No. JP59224831, published Dec. 17, 1984, vol. 9, No. 101.

Primary Examiner—Safet Metjahic
Assistant Examiner—J. K. Han
Attorney, Agent, or Firm—Robin, Blecker, Daley & Driscoll

[57] ABSTRACT

There is provided a flash device to which a construction for starting a flash emission without depending on the turning-on of an X-sync contact is added without increasing the number of interfaces between a camera body and the flash device. In the flash device, a change of a clock signal inputted next to emission mode data communicated to the flash device through a serial communication line between the camera body and the flash device is detected and recognized as a flash emission start signal, so that flash emission start control is performed without depending on the turning-on of the X-sync contact and without setting a special interface.

12 Claims, 6 Drawing Sheets

FLASH DEVICE HAVING FLAT EMISSION MODE

BACKGROUND OF THE INVENTION

1. Field of the Invention

The present invention relates to a flash device having a plurality of light emission modes.

2. Description of the Related Art

Among the flash devices arranged to be connected to a camera body, a flash device is known to perform a TTL light emission control as shown in FIG. 6 by using a clock signal for performing a serial communication where a synchronizing clock is used and a so-called X-sync signal which is an emission start signal. Of the signals shown in FIG. 6, CK is a synchronizing clock signal, CHG is a charging completion signal, and X is an emission start signal which is turned on when the shutter has been opened (when a running of the leading curtain of a focal-plane shutter has been completed). Referring to FIG. 6, a start of light emission occurs at the time when the X-sync signal X has been turned on while the synchronizing clock signal CK is at a low level. When it is determined on the camera body side that the amount of emission has reached an optimum amount, the level of the synchronizing clock signal CK becomes high to bring the emission to a stop.

With the above conventional example, a light emission starts after the turning-on (low state) of the X-sync signal. Although no problem occurs with a shutter of the focal plane type in the case of the so-called flash emission at a speed lower than a synchronized shutter speed where the shutter is fully opened, it has been impossible to meet the so-called long-time emission, or focal-plane-shutter flash (FP flash), where the flash device is continuously caused to emit light for a relatively long time period in order to make a flash photography at a speed higher than the synchronized shutter speed possible, since a light emission has to begin before starting of a running of the leading curtain of the shutter.

SUMMARY OF THE INVENTION

In accordance with one aspect of the invention, there is provided a camera system or a flash device capable of performing a long-time emission operation (FP flash operation) without increasing interface signals between the camera body and the flash device.

In accordance with another aspect of the invention, there is provided a camera system or a flash device in which a light emitting operation is started in response to a change of a signal on a clock line after predetermined data has been communicated by using a communication line for performing communication between the camera body and the flash device, so that a flat emission (FP flash) is made independent of a signal from an X-sync contact.

In accordance with a further aspect of the invention, there is provided a flash device comprising serial clock input means for inputting a serial clock pulse for performing a serial communication with a camera body, serial data input means for inputting data from the camera body in synchronism with the serial clock pulse, serial data output means for outputting data in synchronism with the serial clock pulse, signal detecting means for detecting a flash emission start signal which becomes active in synchronism with a fully opened state of a shutter, change detecting means for detecting a change of the serial clock pulse next to a signal indicative of an emission mode received through the serial communication, recognition means for recognizing a state detected by said change detecting means as an emission start signal for a specific emission mode, and emission control means for starting an emission independent of the flash emission start signal on the basis of an output of the recognition means, so that a selection from a plurality of emission modes including a flash emission synchronized with a fully opened state of the shutter and a long-time emission can be made without increasing interface signals between the camera body and the flash device.

In the above construction, the serial clock input means counts a predetermined number of clock pulses as one data unit. The serial data input means recognizes, as one data unit, data of a predetermined length synchronized with the serial clock pulse. The serial data output means outputs, as one data unit, data of a predetermined length in synchronism with the serial clock pulse. The change detecting means detects a change of the next serial clock pulse following a specific emission mode signal. The emission control means performs emission control according to an emission mode indicated on the basis of the specific emission mode signal.

Other aspects or objects of the present invention will be more apparent from an embodiment thereof to be described below by way of the accompanying drawings.

DETAILED DESCRIPTION OF THE PREFERRED EMBODIMENT

Figure 1:
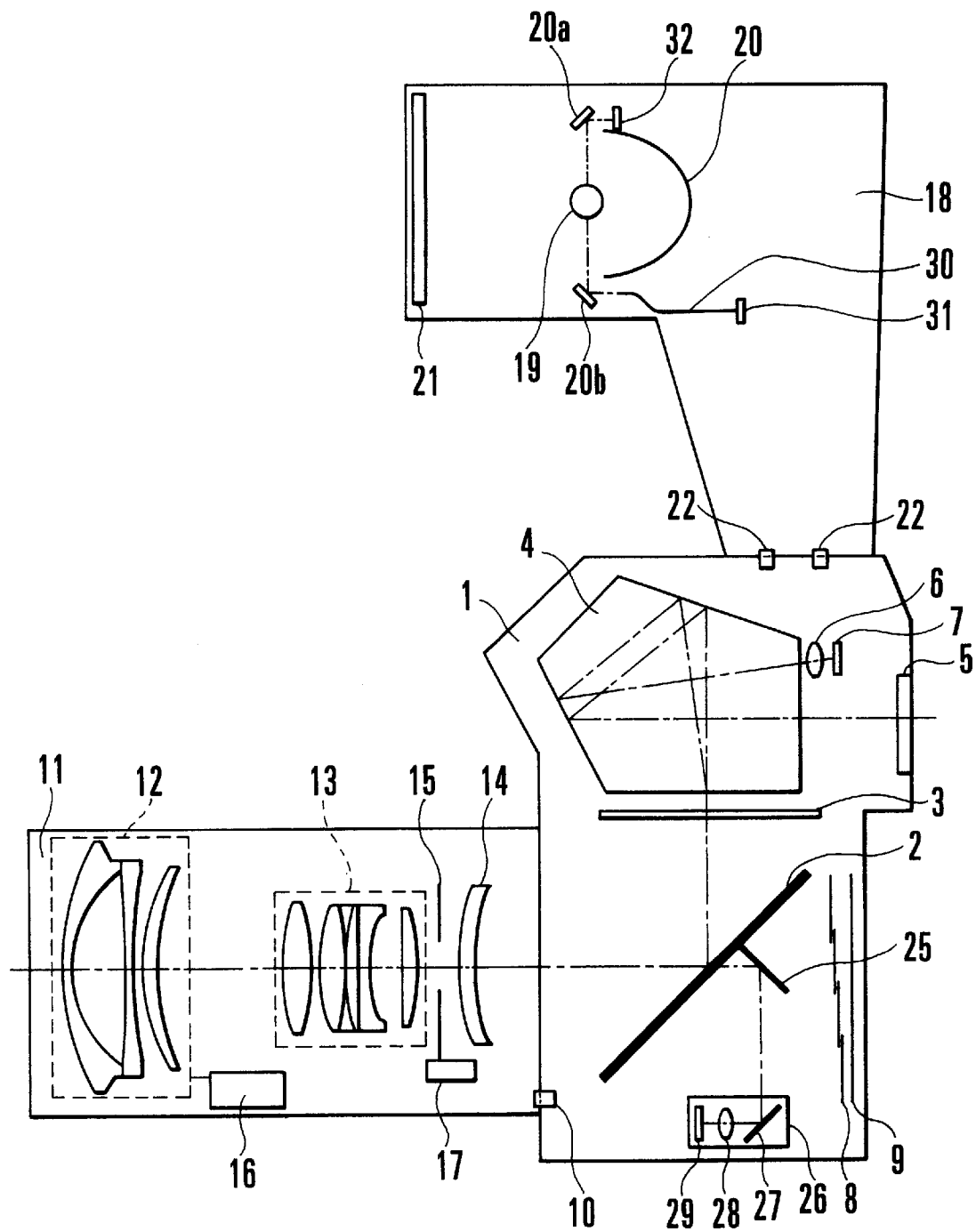
FIG. 1 is a cross sectional view of a flash control camera system showing an embodiment of the present invention.

FIG. 1 is a cross sectional view of a flash control camera system, where the present invention is applied to a single-lens reflex camera, mainly explaining the optical construction thereof.

A camera body 1 contains optical component parts, mechanical component parts, electric circuits, film, etc., to be capable of photographing. A main mirror 2 is obliquely disposed on a photographing optical path or retracted therefrom in accordance with an observing state and a photographing state. Further, the main mirror 2 is provided as a half mirror so that about one half of the light rays from an object be transmitted to a focus detecting optical system (to be described later) even when the main mirror 2 is obliquely disposed. A focusing screen 3 is disposed on a prescribed image forming plane of a photo-taking lens (12 to 14). A pentagonal prism 4 is provided for changing a viewfinder optical path. A viewfinder 5 through which a photographer can see the focusing screen 3 is provided to enable the photographer to observe a photographing image plane. Reference numerals 6 and 7 respectively denote an image forming lens and a light measuring sensor for measuring the luminance of an object within the observing image plane. The image forming lens 6 is arranged to bring the focusing screen 3 and the light measuring sensor 7 into a conjugate relation through a reflecting optical path within the pentagonal prism 4.

Reference numeral 8 denotes a shutter and reference numeral 9 denotes a photosensitive member such as a silver-halide film.

The main mirror 2 is arranged to transmit about one half the light rays from the object even when it is diagonally disposed. A sub-mirror 25 is arranged to bend rays from the object and directs them toward a focus detecting unit 26.

The focus detecting unit 26 is composed of a secondary image forming mirror 27, a secondary image forming lens 28, a focus detecting line sensor 29, etc. The secondary image forming mirror 27 and the secondary image forming lens 28 constitute a focus detecting optical system to form a secondary image forming plane of the photographing optical system on the focus detecting line sensor 29. The focus detecting unit 26 detects a focusing state of the object within the photographing image plane by a known phase-difference detecting method through processing at an electric circuit (to be described later) so as to achieve an automatic focus detecting device by controlling a focus adjusting mechanism of the photo-taking lens.

Reference numeral 10 denotes a mount contact group which serves as an interface between the camera body 1 and the lens unit, and reference numeral 11 denotes a lens barrel to be mounted on the camera body 1. Reference numerals 12 to 14 denote elements which constitute the photo-taking lens, i.e., a first lens group 12 which is capable of adjusting the focus position of the photographing image plane by moving along the optical axis, a second lens group 13 which varies the magnification of the photographing image plane by moving along the optical axis so that the focal length of the photo-taking lens can be changed, and a fixed third lens group 14. Reference numeral 15 denotes a lens diaphragm.

A driving motor 16 is provided for the first lens group 12 and is capable of automatically adjusting the focus position by causing the first lens group 12 to move along the optical axis in accordance with an automatic focus adjusting operation. Reference numeral 17 denotes a driving motor for the lens diaphragm 15, by which the lens diaphragm 15 can be driven to a desired aperture diameter.

An external flash device 18 is mounted on the camera body 1 and performs an emission control in accordance with signals from the camera body 1. A xenon tube 19 serves as a flash tube and converts a current energy into an emission energy. Reference numerals 20 and 21 denote a reflector and a Fresnel lens, respectively, playing a role of efficiently concentrating the emission energy toward the object. A flash contact group 22 serves as an interface between the camera body 1 and the external flash device 18. Reference numeral 30 denotes a light transmission means such as an optical glass fiber which directs the light emitted from the xenon tube 19 to a light receiving element 31 serving as a first light receiving means such as a photo-diode which is the light receiving means for monitoring. The light receiving element 31 is arranged to directly measure the amount of emission of each of a preliminary emission and a main emission of the flash device 18. A light receiving element 32 such as a photo-diode serves as a second light receiving means which also monitors an emission of the xenon tube 19. The emission current of the xenon tube 19 is limited by the output of the light receiving element 32 to perform control on the flat emission (FP flash). Light guides 20a and 20b are incorporated into the reflector 20 and are arranged to reflect light from the xenon tube 19 toward the light receiving element 32 or the optical glass fiber 30.

Figure 2:
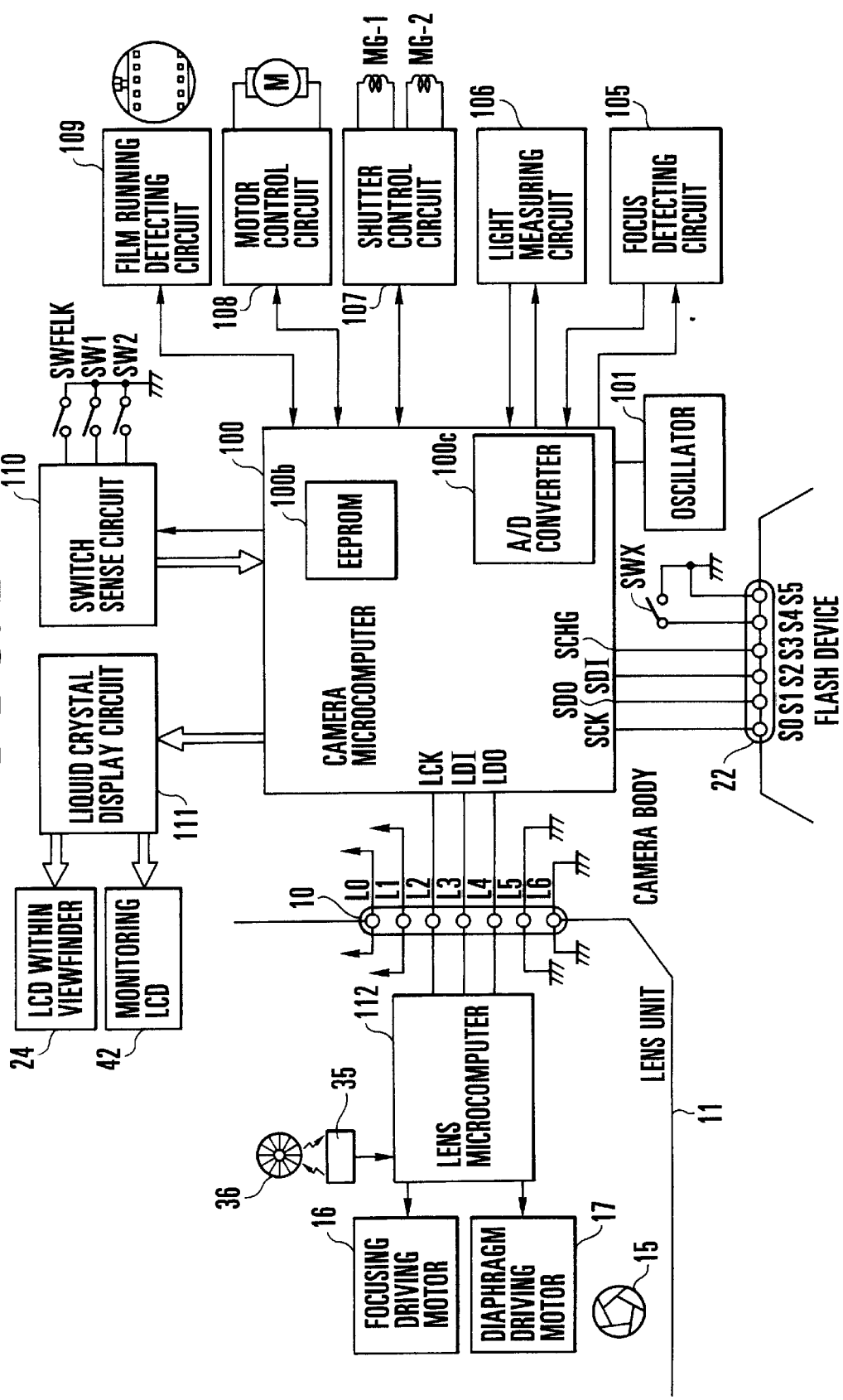
FIG. 2 is a circuit diagram showing the circuit construction of a camera body and a lens unit of the camera system shown in FIG. 1.
Figure 3:
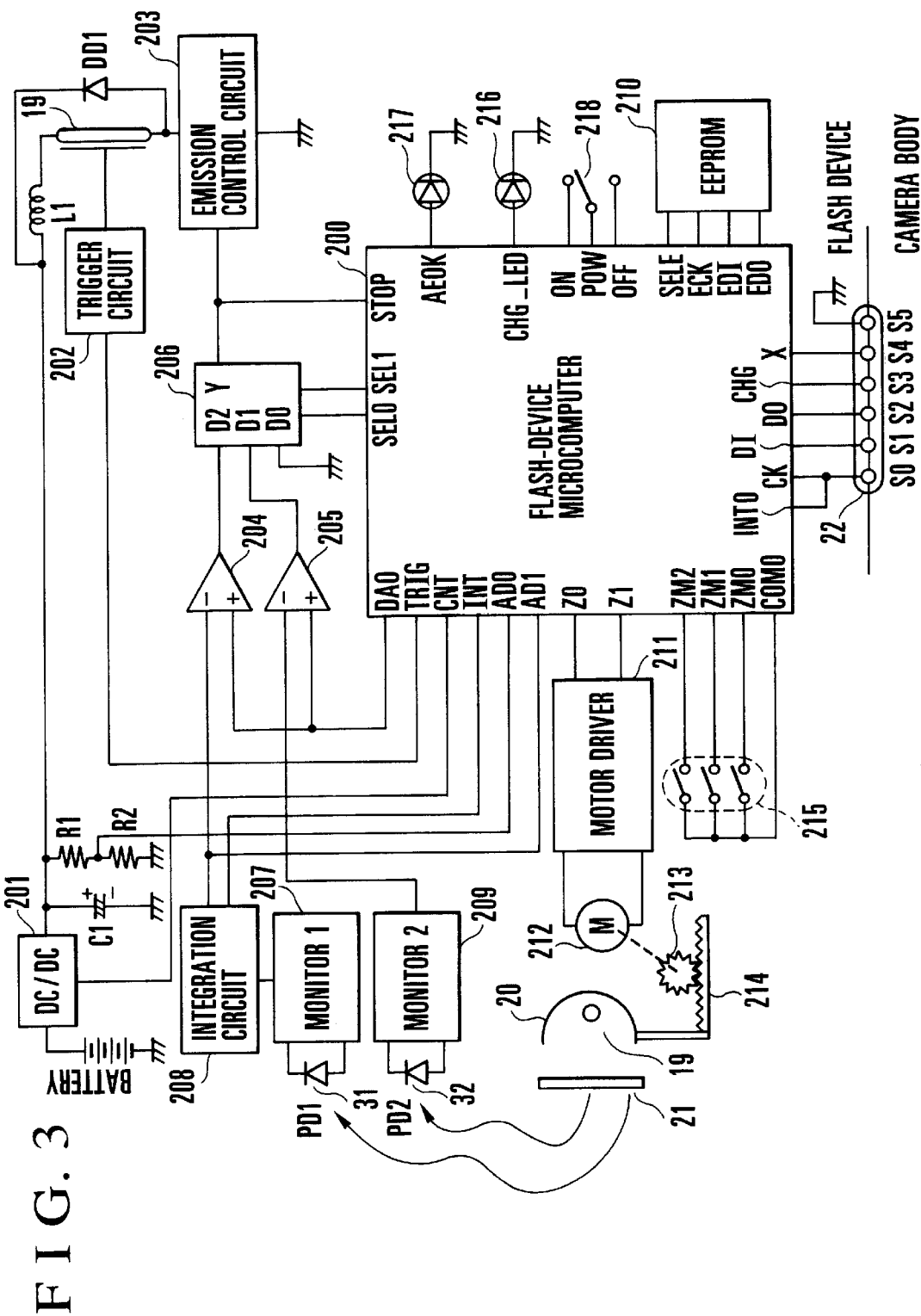
FIG. 3 is a circuit diagram showing the circuit construction of a flash device of the camera system shown in FIG. 1.

FIGS. 2 and 3 are block diagrams showing an electric circuit of the flash control camera system according to the present invention. Members corresponding to those in FIG. 1 are denoted by the same reference numerals.

A camera microcomputer 100 serving as the processing means on the camera body 18 performs an internal operation on the basis of a clock signal generated by an oscillator 101.

An EEPROM 100b serving as a storage means is capable of storing photographing information of a film counter, etc. An A/D converter (analog-to-digital converter) 100c effects an A/D conversion of the analog signals from a focus detecting circuit 105 and a light measuring circuit 106, and the camera microcomputer 100 sets various states by means of signal processing of the A/D converted values. Connected to the camera microcomputer 100 are the focus detecting circuit 105, the light measuring circuit 106, a shutter control circuit 107, a motor control circuit 108, a film running detecting circuit 109, a switch sense circuit 110, and a liquid crystal display circuit 111. Further, the camera microcomputer 100 performs transmission of signals to/from a lens microcomputer 112 serving as a lens control circuit disposed within the photo-taking lens through the mount contact group 10 and also performs transmission of signals to/from a flash-device microcomputer 200 serving as a processing means on the side of the flash device 18 through the flash contact group 22.

The focus detecting circuit 105 performs a charge storing control and a read control of the CCD line sensor 29, which is a known distance measuring element, in accordance with a signal from the camera microcomputer 100 and outputs information of pixels of the line sensor 29 to the camera microcomputer 100. The camera microcomputer 100 effects A/D conversion of this information to perform a focus detection based on a known phase-difference detecting method.

The camera microcomputer 100 performs exchange of signals with the lens microcomputer 112 on the basis of information of the focus detection to perform focusing of the photo-taking lens.

The light measuring circuit 106 provides an output from the light measuring sensor 7 to the camera microcomputer 100 as a luminance signal of the object. The light measuring circuit 106 provides the luminance signal both in a steady state where a preliminary emission of flash light toward the object is not effected and in a preliminary emission state where the preliminary emission is effected. The camera microcomputer 100 effects A/D conversion of the luminance signal and performs an arithmetic operation of the aperture value and an arithmetic operation of the shutter speed for adjusting the exposure at the time of photographing, and performs an arithmetic operation of the amount of emission of the main emission at the time of an exposure.

The shutter control circuit 107 takes a role in the exposure operation by energizing a shutter leading curtain driving magnet MG-1 and a shutter trailing curtain driving magnet MG-2 which constitute the focal plane shutter 8 in accordance with signals from the camera microcomputer 100.

The motor control circuit 108 causes up and down movements of the main mirror 2, charging of the shutter and transport of the film by controlling a motor M in accordance with signals from the camera microcomputer 100.

The film running detecting circuit 109 detects whether a film corresponding to one frame has been wound up at the time of transporting the film and sends signals indicative of the detection to the camera microcomputer 100.

A switch SW1 is arranged to be turned on at a first stroke on a shutter release button (not shown) to start light measurement and automatic focusing. A switch SW2 is arranged to be turned on by a second stroke of the shutter release button to start an exposure operation. A switch SWFELK is arranged to independently perform a preliminary emission to be described later. The switch sense circuit 110 detects the signals from the switches SW1, SW2, SWFELK and other operation members (not shown) of the camera and sends them to the camera microcomputer 100.

The liquid crystal display circuit 111 controls display on an LCD 24 within the viewfinder 5 and on an LCD 42 for monitoring (not shown) in accordance with signals from the camera microcomputer 100. A flash emission start switch SWX is arranged to be turned on at the same time of the completion of a running of the shutter leading curtain.

A description will be given below of interface terminals of the camera microcomputer 100 relative to the flash device 18 and the photo-taking lens.

SCK is an output terminal for a synchronizing clock signal for performing a serial communication with the flash device 18, SDO is a serial data output terminal for serial communication with the flash device 18, SDI is a serial data input terminal for serial communication with the flash device 18, SCHG is an input terminal for detecting a completion of charging of the flash device 18, LCK is an output terminal for a synchronizing clock signal for performing serial communication with the lens, LDO is a serial data output terminal for serial communication with the lens, and LDI is a serial data input terminal for serial communication with the lens.

The construction of the lens will now be described. The camera body 1 and the lens are electrically connected to each other through the lens mount contact group 10. The lens mount contact group 10 includes a power supply contact L0 for the focus driving motor 16 within the lens and for the diaphragm driving motor 17, a power supply contact L1 for the lens microcomputer 112, a clock contact L2 for performing known serial data communication, a contact L3 for transmitting data from the camera body 1 to the lens, a contact L4 for transmitting data from the lens to the camera body 1, a motor ground contact L5 for the power supply for the motors 16 and 17, and a ground contact L6 for the power supply for the lens microcomputer 112.

The lens microcomputer 112 is connected to the camera microcomputer 100 through the lens mount contact group 10 and operates the focusing driving motor 16 and diaphragm driving motor 17 so as to control the focus adjustment and the aperture value. Reference numerals 35 and 36 denote a light detector and a pulse plate, respectively, whereby the lens microcomputer 112 can obtain a position information of the first lens group 12 by counting the number of pulses and is capable of performing the focusing of the lens.

A description will be given below by way of FIG. 3 with respect to the construction of the flash device 18.

The flash-device microcomputer 200 is a circuit for performing the control of the flash device 18 in accordance with signals from the camera microcomputer 100 and performs a control on the amount of emission, a control on the emission intensity and the emission time of a flat emission, a control on the illumination angle of the emission, etc.

Reference numeral 201 denotes a DC/DC converter serving as a step-up circuit which increases a battery voltage to several-hundred volts as directed by the flash-device microcomputer 200 so as to charge a main capacitor C1.

Voltage dividing resistors R1 and R2 are provided for monitoring of the voltage of the main capacitor C1 by the flash-device microcomputer 200. The flash-device microcomputer 200 indirectly monitors the voltage of the main capacitor C1 by effecting A/D conversion of the divided voltage using an A/D converter which is incorporated into the flash-device microcomputer 200. The flash-device microcomputer 200 controls the voltage of the main capacitor C1 to a predetermined voltage by controlling the operation of the DC/DC converter 201.

When the flash device 18 is made to emit flash light, a trigger circuit 202 provides a trigger signal through the flash-device microcomputer 200 as directed by the camera microcomputer 100. The trigger signal induces a discharge of the xenon tube 19 by applying a high voltage at several-thousand volts to a trigger electrode of the xenon tube 19, so that the charge energy stored in the main capacitor C1 is released as an optical energy.

Reference numeral 203 denotes an emission control circuit using a switching element such as IGBT, which is in a conductive state to cause a current of the xenon tube 19 to flow when the trigger voltage is applied at the time of the above described emission. At the time of stopping the emission, the emission control circuit 203 terminates the emission by cutting off the current through the xenon tube 19 in a cut-off state.

Reference numerals 204 and 205 denote comparators. The comparator 204 is used for stopping an emission at the time of a flash emission which will be described later. The comparator 205 is used in controlling the emission intensity at the time of a flat emission which will be described later. A data selector 206 selects an input from terminals D0 to D2 and outputs it at a terminal Y in accordance with selection signals SEL0 and SEL1 from the flash-device microcomputer 200.

A flash-emission control monitor circuit 207 logarithmically compresses and amplifies the output of the light receiving element 31.

An integration circuit 208 integrates the output of the monitor circuit 207. A flat-emission control monitor circuit 209 amplifies the output of the light receiving element 32. An EEPROM 210 is a storage means for storing the above described flat emission time, etc. Reference numeral 211 denotes a known motor driving circuit, 212 denotes a zoom driving motor, 213 denotes a pinion gear, 214 denotes a rack, 215 denotes a zoom position detecting encoder for detecting the position of the reflector 20, 216 denotes an LED for indicating that an emission is possible, and 217 denotes a light control confirming indication LED for indicating that the light control is possible.

The respective terminals of the flash-device microcomputer 200 will now be described.

INT0 is an interrupt input terminal for detecting a change of the synchronizing clock signal for performing serial communication with the camera body 1, CK is an input terminal for the synchronizing clock signal for performing serial communication with the camera body 1, DI is an input terminal for serial communication data, D0 is a data output terminal for serial communication data, CHG is an output terminal for informing the camera body 1 of the state where the emission of the flash device 18 is possible as a current, X is an input terminal for an emission start signal from the camera body 1, ECK is an output terminal for providing a communication clock signal for performing serial communication with a writable storage means such as EEPROM or flash ROM which is the storage means externally connected to the flash-device microcomputer 200, EDI is an input terminal for serial data from the above storage means, EDO is an output terminal for serial data to the above storage means, and SELE is an enable terminal for enabling communication with the storage means and, for convenience of explanation, is assumed to enable it when driven to a low level and disable it when driven to a high level. It should be noted that, while, in the present embodiment, the storage means is provided at the outside of the flash-device microcomputer 200, the same result can naturally be obtained by incorporating it into the flash-device microcomputer 200. POW is an input terminal for inputting the state of a power switch 218, OFF is an output terminal for bringing the flash device 18 into the off state when connected to the power switch 218, and ON is an output terminal for bringing the flash device 18 into the on state when connected to the power switch 218. In the power-on state, the terminal POW is connected to the terminal ON, the terminal ON at that time being in a high impedance state while the terminal OFF being in a low impedance state. In the power-off state, the states are reversed. CHG_LED is a display output terminal for displaying that an emission is possible, and AEOK is a display output terminal for indicating whether the light control is possible or not.

STOP is an input terminal for an emission stop signal and, for convenience of explanation, is assumed to be in an emission-terminated state when driven to a low level. SEL0 and SEL1 are output terminals for directing an input selection of the above described data selector 206. When the combination of the output terminals SEL0 and SEL1 is (SEL1,SEL0)=(0,0), the terminal D0 is connected to the terminal Y. In a similar manner, the terminal D1 is selected when (0,1), while the terminal D2 is selected when (1,0).

DAO is a D/A output terminal incorporated into the flash-device microcomputer 200 and outputs a comparison level of the comparators 204 and 205 as an analog voltage. TRIG is a trigger signal output terminal for directing an emission to the trigger circuit 202. CNT is an output terminal for controlling start/stop of oscillation of the DC/DC converter 201 and, for convenience of explanation, starts charging when driven to a high level and stops charging when driven to a low level. INT is a terminal for controlling start/prohibition of an integration operation of the integration circuit 208, prohibiting integration when driven to a high level while enabling integration when driven to a low level.

AD0 and AD1 are A/D input terminals for converting input voltages into digital data which can be processed within the microcomputer 200, the input terminal AD0 monitoring the voltage of the main capacitor C1 and the input terminal AD1 monitoring the integration output voltage of the integration circuit 208.

Z0 and Z1 are control output terminals for controlling the motor driving circuit 211 for driving the zoom driving motor 212. ZM0, ZM1 and ZM2 are input terminals for inputting the state of the zoom position detecting encoder 215. COM0 is a common terminal for drawing a current corresponding to a ground level of the zoom position detecting encoder 215.

A light emitting operation will now be described.
[Preliminary Emission]

When the flash device 18 is brought into a state where an emission is possible in the above described fundamental operation of the flash device 18, the camera microcomputer 100 detects that an emission is possible and, when a preliminary emission is to be performed, communicates the emission intensity and the emission time of the preliminary emission and transmits "flat emission mode" to the flash-device microcomputer 200 through the above described communication terminals. When the "flat emission mode" has been directed, the flash-device microcomputer 200 sets a predetermined voltage at the terminal DAO in accordance with a predetermined emission intensity signal directed by the camera body 1. The above operation is the state up to Communication 2 in FIG. 4.

Figure 4:
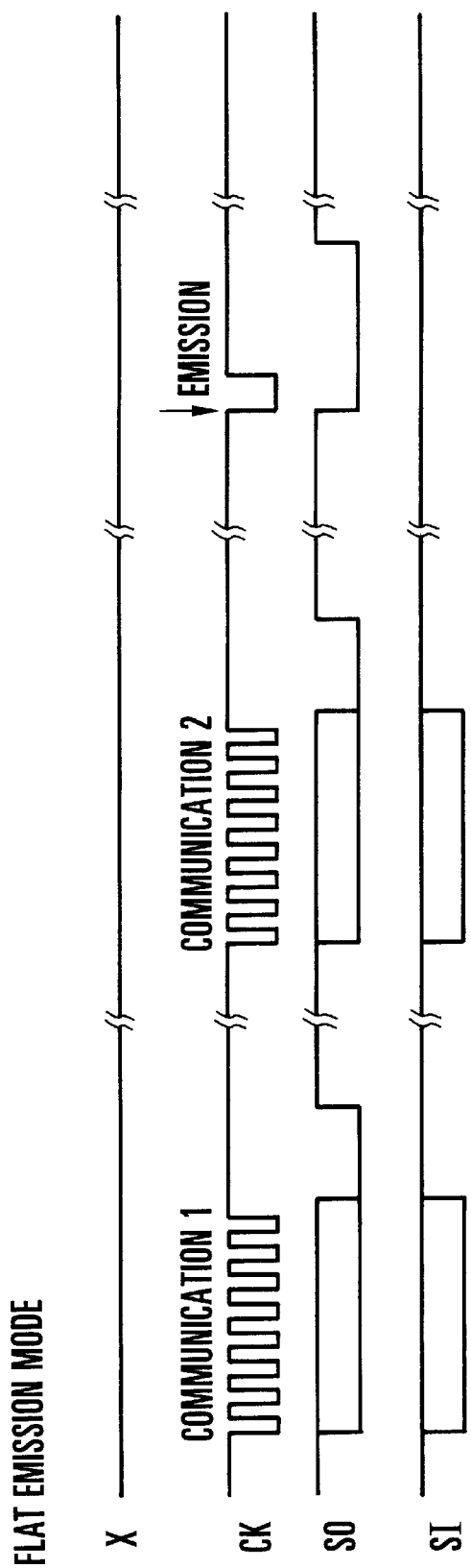
FIG. 4 is a timing chart showing an emission timing in a flat emission mode (FP flash mode).

Next, as shown in FIG. 4, when the terminal CK is brought to a low level due to a direction of the emission from the camera body 1, a low level edge interrupt is generated from the terminal INT0 which is monitoring the terminal CK, and the following emission processing is performed.

First, a low level and a high level are outputted from the terminals SEL1 and SEL2, respectively, to select the input terminal D1. At this time, since the xenon tube 19 is not yet caused to emit light, a photoelectric current of the light receiving element 32 scarcely flows and an output of the monitor circuit 209 to be inputted to an inverting input terminal of the comparator 205 is not generated. Since the output of the comparator 205 is at its high level, the emission control circuit 203 is brought to its conductive state. Next, when a trigger signal is outputted from the terminal TRIG, the trigger circuit 202 generates a high voltage and excites the xenon tube 19 to start an emission.

On the other hand, the flash-device microcomputer 200 directs start of the integration operation to the integration circuit 208 after a predetermined time period from the generation of the trigger signal, and the integration circuit 208 starts the integration of the output of the monitor circuit 207, i.e., the logarithmically compressed photoelectric output of the light quantity integrating light receiving element 31 and at the same time starts a timer for counting a predetermined time period. It should be noted that the reason for delaying start of integration from the generation of the trigger signal is to prevent an integration of noises other than optical signal by the integration circuit 208 due to noise resulting from the generation of the trigger signal and at the same time to take into consideration that a delay of the order of 10 $\mu$sec occurs in the actual emission.

When the preliminary emission is started, the photoelectric current of the light receiving element 32 for controlling the emission intensity of the flat emission is increased. When the output of the monitor circuit 209 is increased to be higher than the predetermined comparison voltage set at the non-inverting input terminal of the comparator 205, the output of the comparator 205 is inverted to a low level. Although the emission control circuit 203 cuts off the emission current of the xenon tube 19 so that the discharge loop is shut down, a feed-back loop is formed by a diode DD1 and a coil L1. After the termination of an overshoot due to a delay of the circuit, the emission current is gradually decreased. Since the emission intensity is reduced as the emission current decreases, the photoelectric current of the light receiving element 32 is reduced and the output of the monitor circuit 209 is lowered. When the output of the monitor circuit 209 becomes lower than the predetermined comparison level, the output of the comparator 205 is inverted to a high level again, and the emission control circuit 203 becomes conductive again to form a discharge loop of the xenon tube 19 so that the emission current is increased and the emission intensity also becomes higher. In such a manner, the comparator 205 repeats an increase and decrease of the emission intensity in a short cycle around the predetermined comparison voltage set at the terminal DAO and, as a result, it is possible to provide control on the flat emission where an emission is continued at substantially a desired constant emission intensity.

When a predetermined emission time of the preliminary emission has elapsed by counting the above described emission time timer, the flash-device microcomputer 200 sets the terminals SEL1 and SEL0 to a low level, respectively, and the terminal D0, i.e., the low level input is selected at the input of the data selector 206. The output of the data selector 206 is forced to a low level, so that the emission control circuit 203 cuts off the discharge loop of the xenon tube 19 to bring the emission to an end.

At the time of completion of the emission, the flash-device microcomputer 200 reads and subjects to A/D conversion the output of the integration circuit 208 integrating the preliminary emission from the A/D input terminal AD1, so that the flash-device microcomputer 200 can read the integrated value, i.e., the amount of emission during the preliminary emission as a digital value.

During the above preliminary emission, the camera body 1 measures, at the light measuring circuit 106 with the output of the light receiving element 7, an amount of exposure EVF in the preliminary emission from the reflected light from the object. Prior to the preliminary emission, the camera microcomputer 100 has conducted a light measuring operation of natural light through the light measuring circuit 106 to obtain an amount of exposure EVS from the light measuring operation. Then, the camera microcomputer 100 determines the amount of emission of the following main emission from the amount of exposure EVS and the result of light measurement where the light reflected from the object in the above described preliminary emission is included. In other words, only the amount of exposure due to the reflected light from the object at the time of the preliminary emission is measured by subtracting the amount of exposure EVS from the amount of exposure EVF, and a difference between the result of that light measurement and a correct exposure becomes an amount of exposure of the main emission relative to the preliminary emission. Then, a peak value in the main emission is determined on the basis of the amount of emission of the above described preliminary emission.

[Main Emission]

The main emission will now be described.

In the sequence of the main emission after turning-on of the shutter release switch SW2, the camera microcomputer 100 determines the shutter speed and the aperture value from the above described correct exposure amount of natural light as well as the exposure mode, the film sensitivity and the reflected light from the object at the time of the preliminary emission. If the shutter speed at this time is faster than the flash-synchronizing speed, a flat emission is effected also in the main emission, while a flash emission is performed in the main emission if the shutter speed is slower than the flash-synchronizing speed.

The control on the main emission at the time of the flat emission will now be described.

[Flat Main Emission (FP Flash Main Emission)]

In the control of the flat main emission, the camera microcomputer 100 communicates the emission intensity and the emission time of the main emission and transmits "flat emission mode" to the flash-device microcomputer 200 through the above described communication terminals. When the "flat emission mode" is directed, the flash-device microcomputer 200 sets a predetermined voltage at the terminal DAO in accordance with a predetermined emission intensity signal (the peak value obtained in the above described preliminary emission) as directed by the camera body 1. So far the state up to Communication 2 in FIG. 4 has been described.

Next, as shown in FIG. 4, when the terminal CK is brought to a low level due to an emission direction from the camera body 1, a low level edge interrupt is generated from the terminal INT0 which is monitoring the terminal CK, and the following emission processing is performed.

First, a low level and a high level are outputted from the terminals SEL1 and SEL2, respectively, to select the input terminal D1. At this time, since the xenon tube 19 has not yet emitted, a photoelectric current of the light receiving element 32 scarcely flows and an output of the monitor circuit 209 to be inputted to the inverting input terminal of the comparator 205 is not generated. Since the output of the comparator 205 is at its high level, the emission control circuit 203 is brought to its conductive state. Next, when a trigger signal is outputted from the terminal TRIG, the trigger circuit 202 generates a high voltage and excites the xenon tube 19 to start an emission. Further, as the emission is started, the flash-device microcomputer 200 starts the timer for counting a time period directed from the camera body 1.

Since the emission intensity control of the flat emission is the same as that of the preliminary emission, a description thereof will be omitted.

After a predetermined emission time has elapsed by counting the above described emission time timer, the flash-device microcomputer 200 sets the terminals SEL1 and SEL0 to a low level, respectively, and the terminal D0, i.e., the low level input is selected at the input of the data selector 206. The output of the data selector 206 is forced to a low level, so that the emission control circuit 203 cuts off the discharge loop of the xenon tube 19 to bring the emission to an end.

Control of the flash main emission will now be described.

[Flash Main Emission]

In the control of the flash main emission, the camera microcomputer 100 communicates the emission intensity of the main emission and transmits "flash emission mode" to the flash-device microcomputer 200 through the above described communication terminals. When the "flash emission mode" is directed, the flash-device microcomputer 200 sets a predetermined voltage at the terminal DAO in accordance with a predetermined emission intensity signal as directed by the camera body 1. This predetermined voltage is obtained by adding or subtracting a voltage corresponding to a relative amount to or from the integrated output read from the terminal AD1 at the end of the above described preliminary emission.

Figure 5:
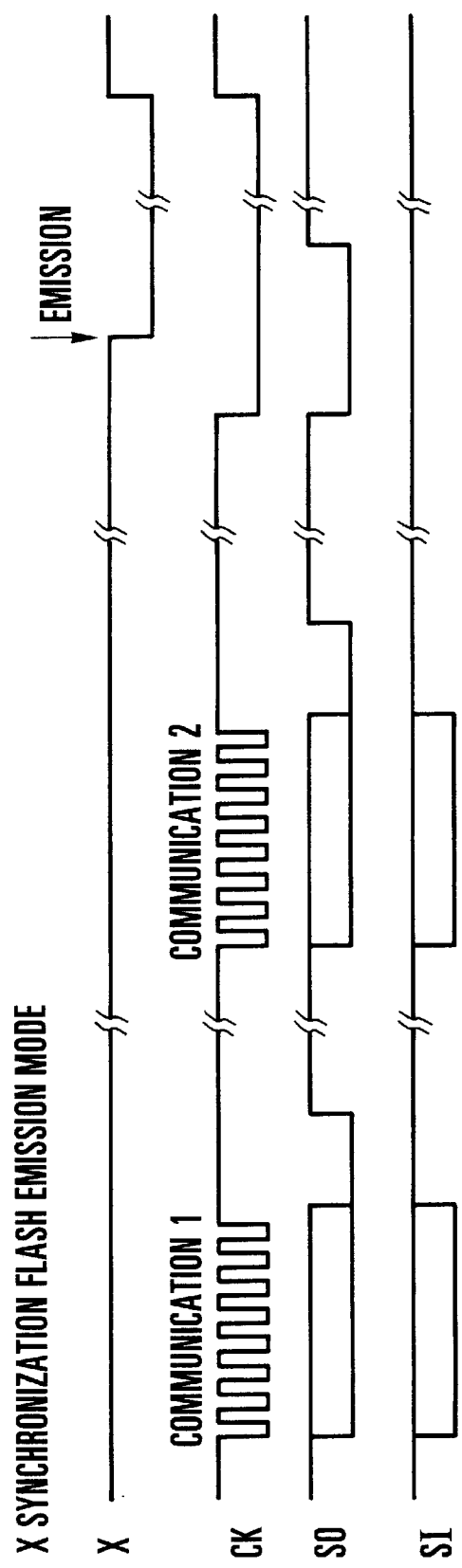
FIG. 5 is a timing chart showing an emission timing in an ordinary flash emission mode.
Figure 6:
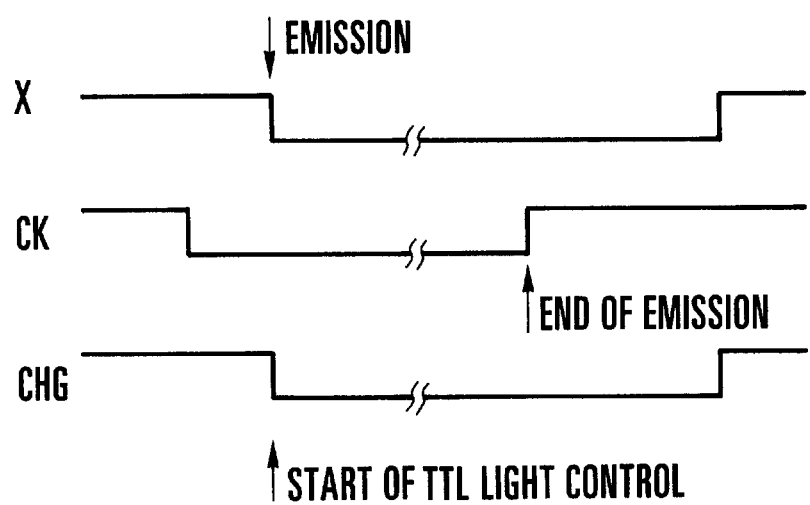
FIG. 6 is a timing chart showing an emission timing in a conventional flash device.

So far the state up to Communication 2 in FIG. 5 has been described.

Next, as shown in FIG. 5, when the terminal CK is brought to a low level due to an emission direction from the camera body 1, a low level edge interrupt is generated from the terminal INT0 which is monitoring the terminal CK, and the following emission processing is performed.

First, a high level and a low level are outputted from the terminals SEL1 and SEL0, respectively, to select the input terminal D2. At this time, since the operation of the integration circuit 208 is prohibited, the output of the integration circuit 208 to be inputted to the inverting input terminal of the comparator 204 is not generated. Since the output of the comparator 204 is at a high level, the emission control circuit 203 is brought to its conductive state. Next, when the switch SWX is turned on and the terminal X is driven to its low level, a trigger signal is outputted from the terminal TRIG, so that the trigger circuit 202 excites the xenon tube 19 by generating a high voltage to start an emission. Further, after the lapse of the order of 10 $\mu$sec where the trigger noise due to application of the trigger signal subsides and the actual emission starts, the flash-device microcomputer 200 sets the integration start terminal INT to a low level, and the integration circuit 208 integrates the output of the light receiving element 31 through the monitor circuit 207. When the integration output reaches a predetermined voltage set at the terminal DAO, the output of the comparator 204 is inverted, so that conduction of the emission control circuit 203 is cut off through the data selector 206 and the emission is terminated. On the other hand, the flash-device microcomputer 200 monitors the terminal STOP and, when the terminal STOP is inverted to stop the emission, the flash-device microcomputer 200 sets a forced emission prohibition state by setting the terminals SEL1 and SEL0 to a low level, respectively, and inverts the integration start terminal INT to thereby complete the integration and terminate the emission processing.

It should be noted that, while, in the above embodiment, the start of an emission has been performed in such a manner that an interrupt is generated at a lowering edge to perform an emission processing, the logic can naturally be reversed.

What is claimed is:

1. A flash photography system having a camera control circuit and a flash emission control circuit, said flash photography system comprising:

a communication line for performing communication between said camera control circuit and said flash emission control circuit, said communication line including a clock line for a clock pulse, data communication being performed between said camera control circuit and said flash emission control circuit in synchronism with the clock pulse on said clock line, wherein said flash emission control circuit generates an emission command to start a light emitting operation by detecting a change in signal on said clock line after predetermined data has been communicated by said data communication.

2. A flash photography system according to claim 1, wherein said predetermined data is data indicative of a flat emission.

3. A flash photography system according to claim 2, wherein said flash emission control circuit starts a light emitting operation in response to a signal from an X-sync contact of a camera when the flat emission is not indicated.

4. A flash photography system according to claim 2, wherein said camera control circuit communicates the data indicative of the flat emission when a shutter time is shorter than a synchronizing time.

5. A flash photography system according to claim 1, wherein said change in signal is a rising or lowering of the clock pulse.

6. A flash photography system according to claim 1, wherein said communication line includes a data line for said data.

7. A flash photography system according to claim 1, wherein said camera control circuit is provided at a camera body and said flash emission control circuit is provided at a flash device mounted on the camera body, and wherein said camera control circuit and said flash emission control circuit are connected to each other through said communication line when the flash device is mounted on the camera body.

8. A flash device comprising:

serial clock input means for inputting a serial clock pulse for performing a serial communication with a camera body;

serial data input means for inputting data from the camera body in synchronism with the serial clock pulse;

serial data output means for outputting data in synchronism with the serial clock pulse;

signal detecting means for detecting a flash emission start signal which becomes active in synchronism with a fully opened state of a shutter;

change detecting means for detecting a change of the serial clock pulse inputted to said serial clock input means next to a signal indicative of an emission mode received from the camera body through said serial data input means by the serial communication;

recognition means for recognizing a state detected by said change detecting means as an emission start signal for a specific emission mode; and emission control means for starting an emission independent of the flash emission start signal on the basis of an output of said recognition means.

9. A flash device according to claim 8, wherein said specific emission mode is a flat emission where a flash light is emitted substantially at a constant emission intensity for a predetermined time period.

10. A flash device according to claim 8, wherein said change of the serial clock pulse is a lowering edge or rising edge.

11. A flash device according to claim 8, wherein said change detecting means is an interrupt generating means generated by a first lowering edge or rising edge of the serial clock pulse for causing a microcomputer to perform an interrupt processing.

12. A flash device according to claim 8, wherein, when said signal indicative of an emission mode represents the specific emission mode, said recognition means recognizes as the emission start signal a change of the serial clock pulse inputted next to receiving of said signal.

* * * * *